No. 710,089. Patented Sept. 30, 1902.
G. H. WILLIAMS.
TYPE WRITING MACHINE.
(Application filed July 11, 1900.)
(No Model.) 5 Sheets—Sheet 3.
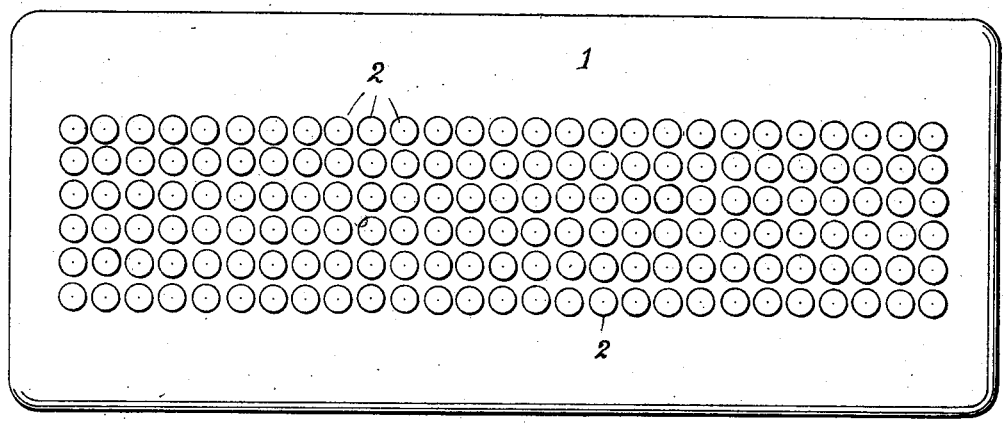
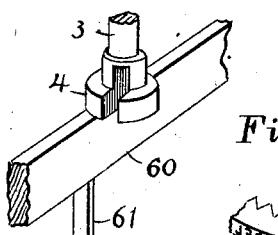
Fig. 3
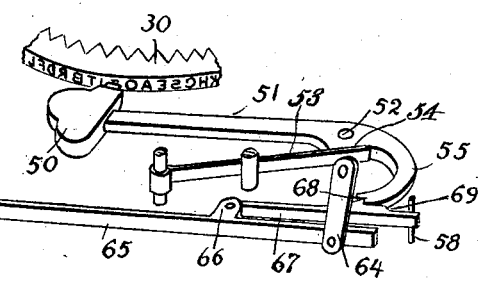
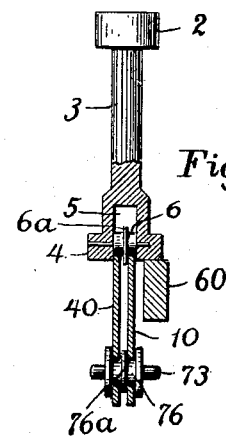
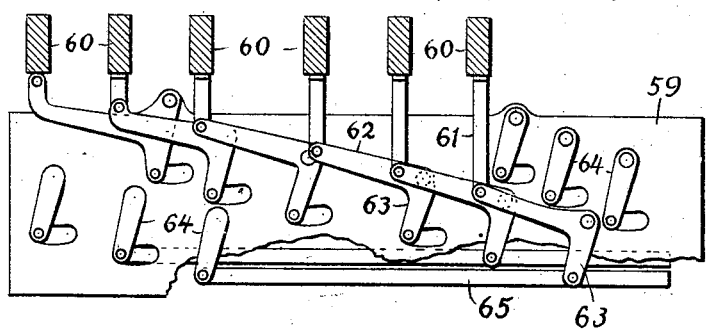
Fig. 5
Witnesses; Inventor,
George H. Williams,
By A. B. Upham,
His Attorney.
THE NORRIS PETERS CO., PHOTO-LITHO., WASHINGTON, D. C.

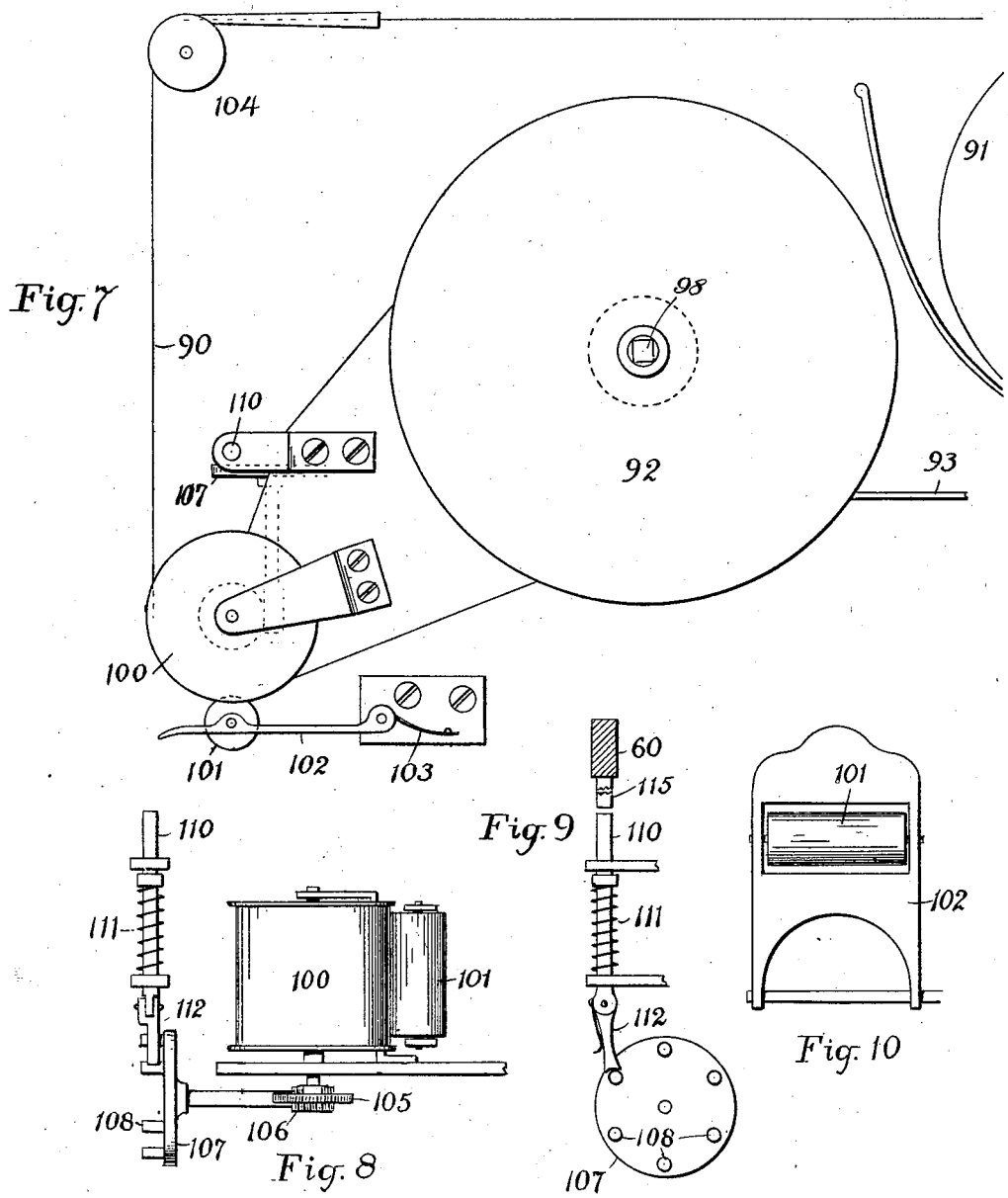

No. 710,089. Patented Sept. 30, 1902.
G. H. WILLIAMS.
TYPE WRITING MACHINE.
(Application filed July 11, 1900.)
(No Model.) 5 Sheets—Sheet 5.
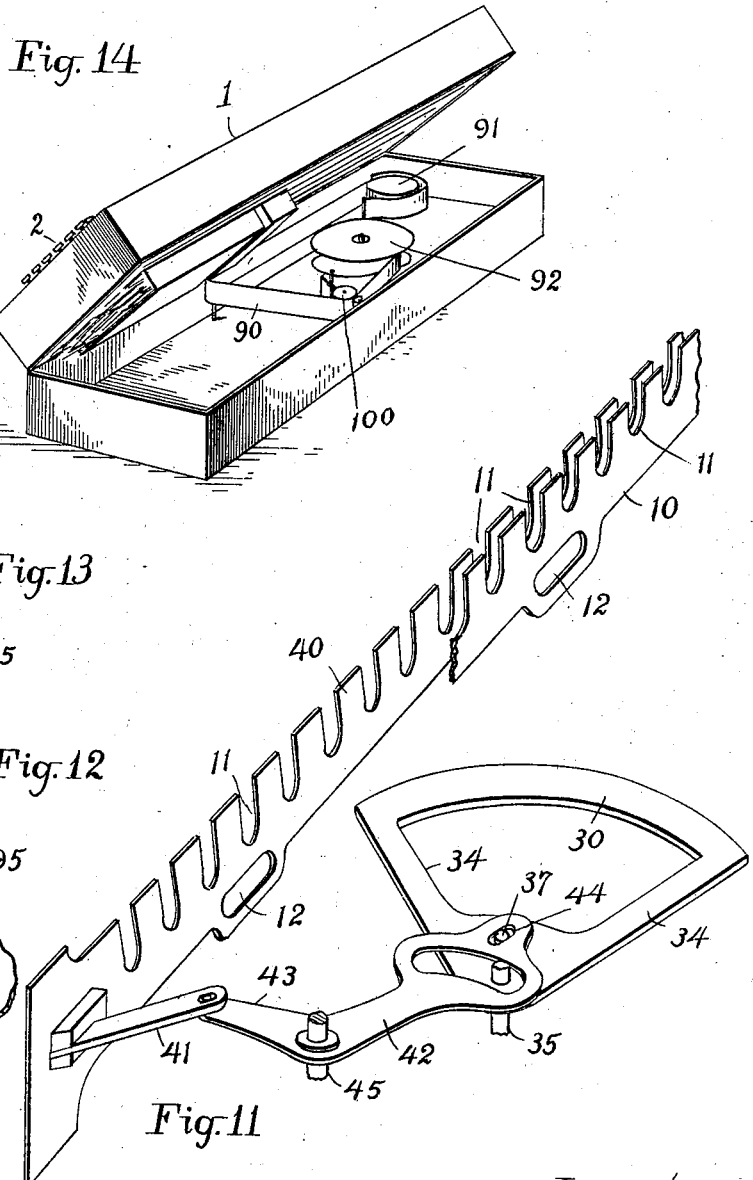
Witnesses;
Inventor,
George H. Williams;

UNITED STATES PATENT OFFICE.

GEORGE H. WILLIAMS, OF BOSTON, MASSACHUSETTS, ASSIGNOR TO STENOTYPE COMPANY, OF BOSTON, MASSACHUSETTS, A CORPORATION OF MAINE.

TYPE-WRITING MACHINE.

SPECIFICATION forming part of Letters Patent No. 710,089, dated September 30, 1902.

Application filed July 11, 1900. Serial No. 23,242. (No model.)

*To all whom it may concern:*

Be it known that I, GEORGE H. WILLIAMS, a citizen of the United States, residing at Roslindale, Boston, Massachusetts, have invented certain new and useful Improvements in Type-Writing Machines, of which the following is a full, clear, and exact description.

The object of this invention is the construction of a type-writing machine by means of which a plurality of characters can be printed simultaneously upon a paper tape and extending in groups transverse thereto.

Figure 1:
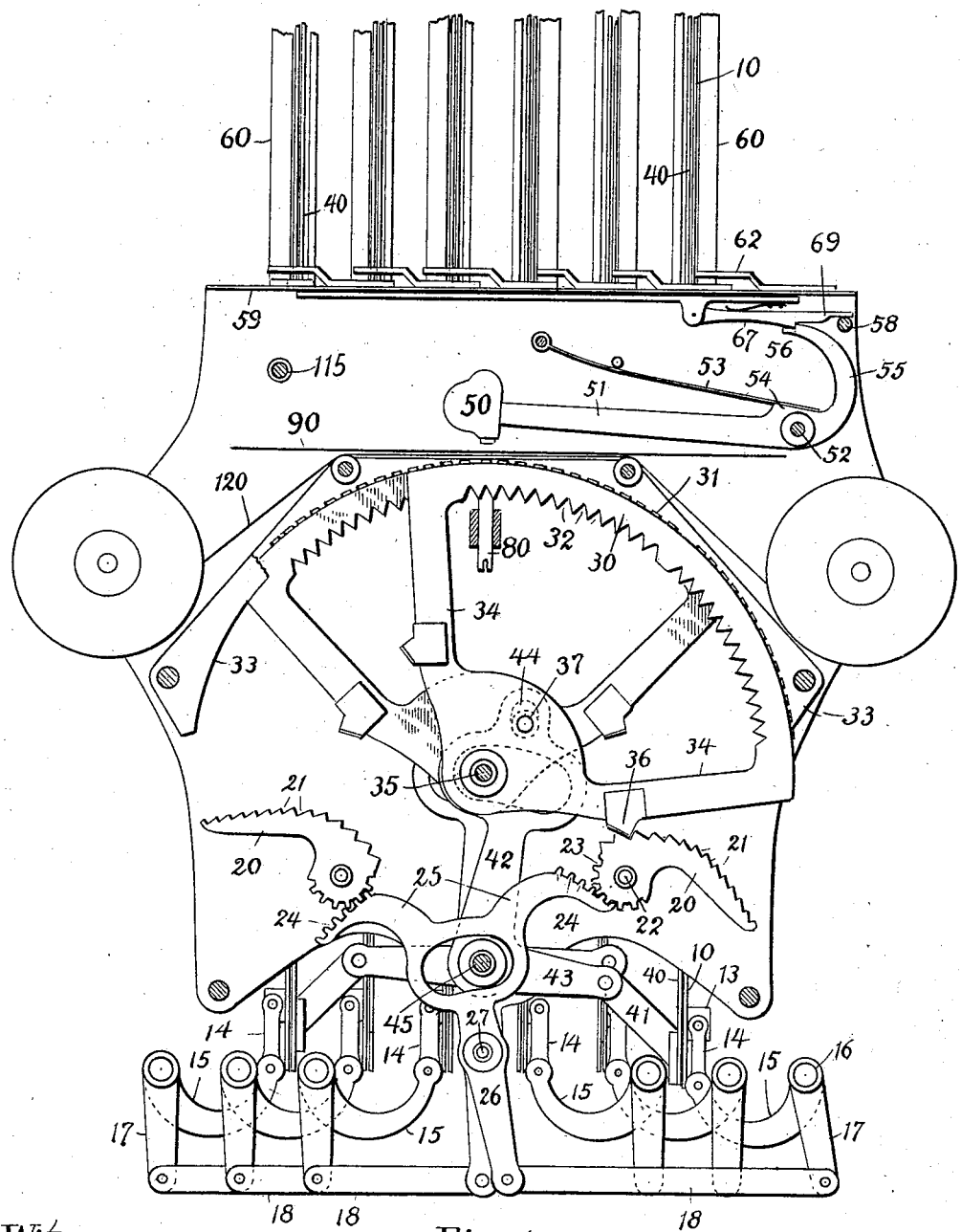
Figure 2:
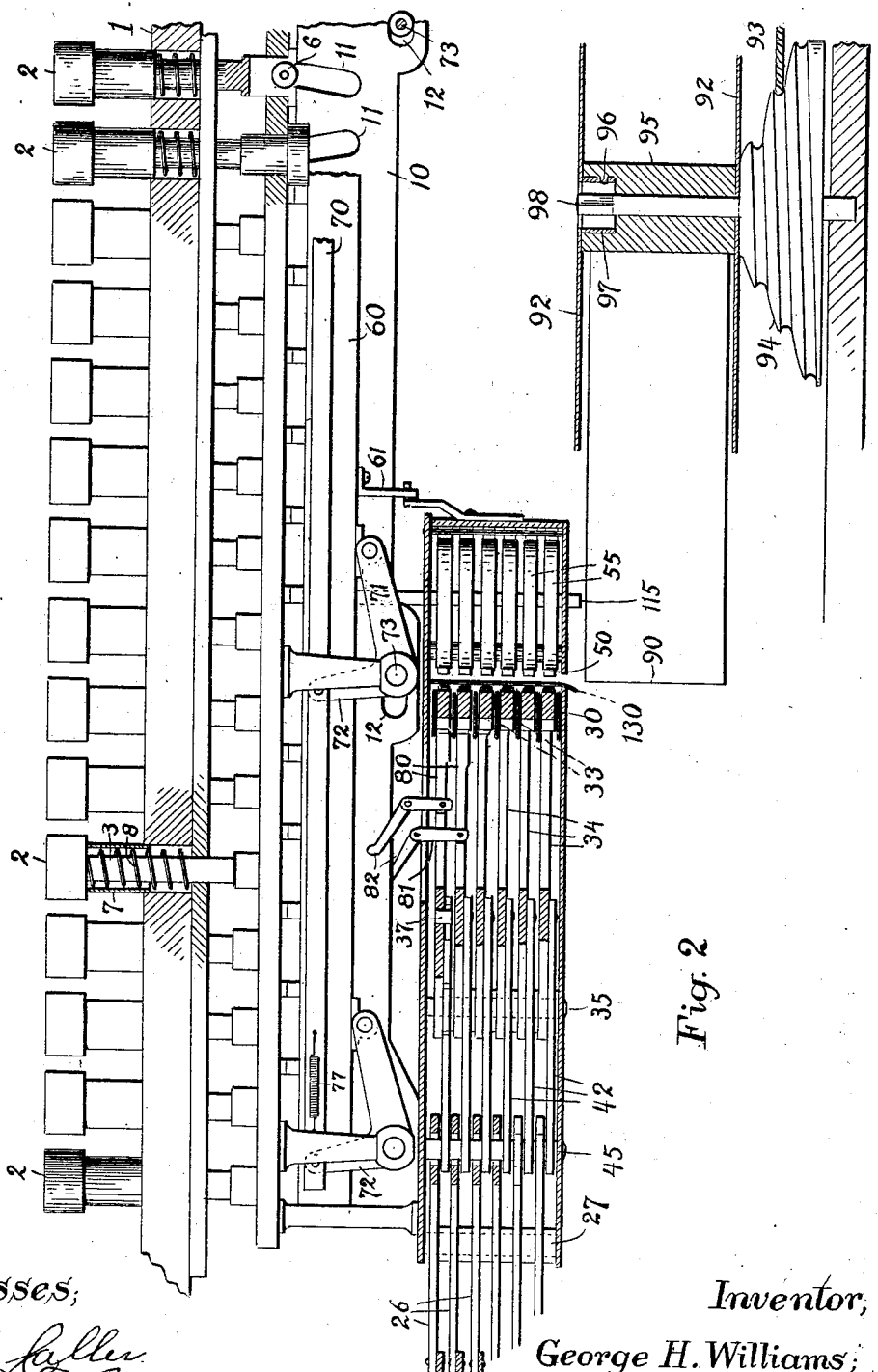

Referring to the drawings forming part of this specification, Figure 1 is a bottom view of the type-bar-shifting mechanism. Fig. 2 is a longitudinal sectional elevation of the major part of the machine. Fig. 3 is a plan view of the complete machine-case, showing the arrangement of the keys. Fig. 4 is a detail perspective view showing the means for actuating the printing-hammer. Fig. 5 is a detail view showing the means whereby the key-depressed bars of the machine actuate said hammers. Fig. 6 illustrates one of the keys and its engagement with a key-depressed bar and also two type-bar actuators. Fig. 7 is a plan view of the paper tape or ribbon controlling devices. Fig. 8 is an elevation of the ribbon-feeding mechanism. Fig. 9 is another elevation of the same, but at right angles to the former view. Fig. 10 is a face view of the pressure-roll support. Fig. 11 is a perspective view illustrating the mechanism by means of which a longitudinally-moved bar or actuator is enabled to operate a type-bar. Fig. 12 is a perspective view of the core of the paper-winding reel. Fig. 13 is a transverse section of the same, and Fig. 14 is a perspective view showing my type-writing machine as arranged within its hinged case.

This type-writing machine is designed to be operated by a keyboard such as is set forth in pending application of G. G. Allen, Serial No. 611,760.

This type-writing machine is preferably entirely inclosed within a wooden case or casket 1, with nothing save the keys 2 exposed to view, the case being somewhat narrow in proportion to its length, as indicated in Fig. 3. These keys are arranged in parallel rows, each row comprising a complete alphabet and being in control of an equal number of type-bars. By depressing any one of the keys in each row simultaneously the type-bars are shifted until the characters thereon corresponding to the keys depressed are brought into alinement transverse to the paper ribbon 90, supported thereat. At the same time a number of hammers 50 equal to the keys depressed are caused to strike the tape against said alined characters and by means of an interposed inking-ribbon to print the same upon said tape. A depression of any key in one of the rows causes the tape to be fed a single space and to print another set of characters parallel with the first. It will therefore be seen that in this machine the type characters are not printed in order longitudinally along the tape, but each set of letters composing a word is printed transversely across the tape, with word or words following word in parallel rows. In case a word is composed of more than six letters—the number of key-rows—the balance of the word must be printed by a second depression of the keys and appear in the next line after the first section.

The six type-bars 30 are exact copies of each other and are preferably curved into a segment of a circle and terminally held by the radial arms 34 and revoluble about the shaft 35. The normal position of these type-bars is with their center opposed to the hammer 50, at which point each type-bar is blank. I design to have the said bars swing to one side or the other of the hammer, according to which key is depressed of the row to which it belongs, the keys of one half the row being adapted to swing the type-bar to one side and the other half to the other. To thus actuate the type-bars, I have devised the mechanism shown most clearly in Figs. 1 and 11. This comprises in each case a bell-crank lever 42, pivoted at 45 and having a slot 44 engaging the pin 37, projecting from the type-bar segment, the arm 43 of said lever being joined to the longitudinally-movable bar 40 by the connecting-rod 41. Said bars 40 are formed with slots 11, much like those of the bars 10 shown in Fig. 2, said slots or cam-slots being slightly oblique or vertically inclined in order that when any one of the keys is depressed its antifriction-roll 6 shall give said bar a short longitudinal throw, the latter being supported by guides 73, extending through the slots 12 in said bars. By this arrangement whenever one of the keys 2 of any row is depressed the bar 40 belonging thereto is moved longitudinally and through the connecting-rod 41 and lever 42 the type-bar 30 is swung to the proper point to present the character desired. The several cam-slots 11 in each bar 40 are so varied in degree of inclination as to correspondingly vary the extent to which the type-bar 30 is swung. In this manner when the "R" key, for instance, is depressed the type-bar is swung until "R" is presented to its hammer 50.

As shown more clearly in Fig. 2, there are as many type-bars 30 as there are rows of keys and a separate hammer for each type-bar. Whenever then one key in each row is depressed the type-bars are all swung to the proper points to present the selected characters in a vertical line opposed to the hammers 50, while simultaneously the hammers are all tripped and the paper tape 90 struck against the inking-ribbon 120 and such selected type characters.

To prevent their momentum carrying the type-bars too far, I provide stops therefor. (Shown in Fig. 1.) These comprise the devices 20, horizontally swinging upon the pivot-shafts 22 and provided with graded impact-notches 21, each a short distance farther from the pivot-shaft 22 than its predecessor. These stops are in duplicate sets, one for each side of the type-bars, and are automatically swung to the proper points by means of the levers 26, whose rack-arms 25 engage the teeth 23 of said stops. Said levers are actuated through the rods 18, lever-arms 17 15, pivoted at 16, and coupled by the links 14 to the movable bars 10, these last-named parts being located beside the bars 40, already described, and varying therefrom only in the degrees of inclination of the cam-slots 11.

There are as many levers 26 and duplicate stops 20 as there are type-bars 30, although but one of each pair of stops is utilized at a time, depending upon the side to which the type-bar is swung.

Each type-bar is provided with two impact-lugs 36, faced with leather to prevent noise, and these lugs and the notches of the stops are so arranged as to meet at the proper points to present the type character selected. As shown in Fig. 1, said levers 42 are slotted to make room for the pivot-shaft 35 of the type-bars, while the levers 26 are slotted to make room for the pivot-shaft 45 of the levers 42, the latter levers being pivoted at 27.

The above-described stops for the type-bars are generally sufficient to properly bring the type-bars to rest; but to insure their exact alinement I usually form the inner faces of said bars with the V-notches 32 and provide pointed locks 80, adapted to enter the same at the instant the type-bars have been brought to their required positions. These locks are actuated, as shown in Fig. 2, by the levers 81, whose arms 82 are adapted to be met by the hammer-actuating bars 60 as the latter descend, the positioning being such that said bars do not meet said arms until the type-bars have been brought into position. At such instant the further depression of said bars to actuate the hammers forces said locks into the notches of the type-bars and holds them accurately in place while the printing is being done.

The mode of actuating the hammers 50 is shown most clearly by Fig. 4. At the lower end of the key-stem 3 is a shoulder contacting with the upper face of a bar 60, connected by a link 61 to the arm 62 of the small bell-crank lever 63. Pivoted to said lever and kept parallel by an arm 64 is a rod 65, carrying a detent 67, pivoted thereto within the ears 66. The hammer 50 has its handle 51 pivotally swung at 52 and formed with the curved tail 55, whose extremity is engaged by the detent-shoulder 68. A spring 53, pressing upon the face 54 of the hammer-handle, serves to elastically retain it in the position shown in Fig. 1. When now the bar 60 is depressed, the rod 65, and hence the detent 67, is forced longitudinally, thereby moving the hammer 50 farther away from the paper 90; but when said hammer has been moved back far enough to give it the desired potential energy the shoulder 69 of the detent 67 meets and rides behind the fixed post 58, thereby removing the detent-shoulder 68 from engagement with the tail extremity 56 and so relesing the hammer. Being thus released the hammer flies against the paper with sufficient force to give the same a printing pressure against the ink-ribbon and type character and then returns to its normal position.

It being recalled that there are as many hammers as there are type-bars and also rows of keys and a depressing-bar 60 beneath the shoulders 4 of each row, it will be evident that either a single hammer will be actuated or all, according to whether a single key is depressed or any one key of each row. Fig. 5 illustrates the method of enabling all six bars 60 and connecting mechanism to be arranged, the latter being all supported upon the plate 59, suitably slotted to enable the arms 64 to be united to the rods 65.

To give the bars 60 a perfectly parallel motion in order that the depression of any key, whether near the ends or middle of said bars, shall equally depress the points of said bars united to the hammer-actuating devices, I support each bar upon the horizontal arms of the crank-arms 71 and unite the vertical arms of the latter by means of the slender rods 70 and each crank-arm being pivotally mounted upon the guide-shafts 73. To counterbalance the bars 60 and return them to their normal positions when the keys are released, I usually attach a tension-spring 77 to the rod or rods 70, as shown in Fig. 2.

I prefer to construct each key 2 with a sleeve 7, fixed thereto and slidable in a suitable opening in the case-top 1, the object of said sleeve being to inclose and conceal the spring 8, by which each key is returned to its normal position.

As shown in Fig. 14, the case containing my mechanism is made in two parts hinged together, and so capable of being opened when it is desired to remove or apply paper tape, the type-writing mechanism being secured to the upper part of said sections and the paper-feeding devices being carried in the lower section. When the upper section is turned up and back, the length of paper which is usually supported between the type-bars and hammers leaves the same, as shown in Fig. 2, there being close but ample clearance for the same. Referring to Fig. 7, the paper tape 90 is shown as extending transversely across the machine, being passed about the guide-roll 104 and drag-roll 100. It is unwound from the roll 91 and rewound upon the reel 92, the latter being kept under a constant winding energy by means of the wire or cord 93, wrapped about the drum 94 and tensioned by any suitable means, which after running down is rewound by applying a key to the key-stem 98 of said reel. Said reel comprises the core 95 and thin disks 92, the upper of which is made removable by means of the sleeve 97, rigid with the disk and entering the recess in said core. If desired, a pin 96, adapted to enter a bayonet-joint notch in said sleeve, can be employed to insure the engagement of said disk with the core. This disk is designed to be removed when taking off the paper tape which has been wound on the reel and for applying the end of the tape upon which printing is to be begun. The paper tape being thus under tension at all times it is permitted to advance with the required step-by-step movement by the following construction: The roll 100, which I have termed a "drag-roll," has elastically pressed against it a light roll 101, by which the grip between the tape and said roll or drag 100 is insured. As shown in Figs. 7, 8, and 9, said drag-roll is provided with the worm-gear 105, engaged by the worm 106. The latter is mounted on the same shaft as the face-plate 107, from which projects a number, preferably six, of pins 108. These pins are met by the pawl 112, depending from the rod 110, which is adapted to be impinged upon by the post 115, carried by the bar 60, also shown in Fig. 2. When said bar 60 is depressed, the pawl 112 by its engagement with the pin 108 then beneath it gives the face-plate 107 a partial revolution, and so imparts to the drag-roll 100 the slight movement desired. When the pawl 112 rises under the reaction of the spring 111 and the recession of the bar 60, it engages a new pin 108 and is hence in readiness for giving the drag-roll its next movement.

I provide but one of the bars 60 with a post 115, and this bar is the one connected with the row of keys nearest the operator. He must therefore always begin a word on line upon this first row. For instance, the word "nation" requires that the letter "n" of the first row be depressed, the "a" of the second, the "t" of the third, the "i" of the fourth, the "o" of the fifth, and the "n" of the last. These being all depressed simultaneously, the entire word is printed across the tape. If a word of one letter follows, then a key in the first row alone is depressed, or if of three letters, then of the first, second, and third.

The light roll 101 is mounted in a slot in the pivoted leaf 102 and elastically pressed by a suitable spring 103.

Referring to Fig. 6, it will be seen that the small antifriction-rolls 6 are separated by a thin washer $6^a$, while the antifriction-rolls 76 are similarly separated by a thin washer $76^a$, the object being to slightly separate the two bars 10 40 of each row of keys and to thereby diminish friction.

Inasmuch as the bars 10 and 40 are longitudinally moved with respect to each other, their cam-slots would be in danger of forming interfering edges, which would markedly increase friction between such bars were the latter in lateral contact; but by separating them such interference is prevented and friction diminished.

The reel upon which the paper tape is wound is adapted for the instant and convenient attachment of the paper thereto in the following manner: As shown in Figs. 12 and 13, the core 95, upon which the tape is wound, is formed with a longitudinal groove having a deeply-overhung edge $95^a$. By introducing the end of the tape in the manner illustrated in Fig. 13 the tape will not withdraw itself therefrom while the reel is being revolved and the paper tape being wound thereon so long as the direction of rotation is such as to keep said edge $95^a$ facing forward or so long as the reel is turning in a direction opposite to the hands of a watch.

By giving the reel or the paper a partial turn contrary to this, or, in other words, thus reversing the reel or holding the reel motionless and giving the paper an advance turn, the paper end will be disconnected from said confining-groove and the coil of paper can be at once withdrawn from the reel.

As shown more clearly in Fig. 14, the machine-case is formed in two substantially equal sections hinged together, the upper of which carries the keyboard on its exterior and the writing mechanism within it, while the lower section contains the paper-feeding devices, the parts being so arranged that the transverse part of the paper 90 fits within a slot between the type-bars and hammers as the upper case-section is turned down upon the lower or leaves said slot as the upper section is raised, this latter action being only done when it is desired to remove the written tape or apply a new spool.

Although I have spoken of this machine as being formed with six type-bars, I do not mean to restrict myself thereto, for the reason that it is merely a matter of duplication to enlarge the type-writer to such an extent as to enable the operator to depress ten keys at a time, and so print ten letters simultaneously. It is also a mere matter of duplication of parts to increase the number of rows of keys and the number of type-bars to such an extent as to take in an entire line of writing at a time. This is rendered possible by the construction of the paper-feeding devices in which the paper is adapted to be fed during the first part of the depression of any key in the first row, the latter part of such depression actuating the printing-hammers. In operating the machine the proper character in the first row is depressed, together with the proper character in each of as many succeeding rows as there are letters in the word. At the end of this word the operator skips over the next row and begins the following word in the row after said omitted row, and so on. If the words are short ones of but two or three letters, the operator may print two or even three thereof simultaneously; but for the longer words one at a time is the rule, skipping a row for each word-space.

The above is the preferable manner of operation even when the machine is built, as illustrated, with but six rows of character-keys, two or three short words being printed in a line, as follows:

"If I
go to
Boston,
will I
get an
introd
uction?"

When I speak of a "tape" of paper, I signify any width of paper desired, the same being wound upon a spool or reel.

What I claim as my invention, and for which I desire Letters Patent, is as follows, to wit:

1. The combination with the curved type-bar having pivotal support connected thereto by radial arms and the rigidly-projecting pin; the lever having the slot engaging said pin, and the arm; the longitudinal bar connected with said arm, and having the series of inclined cam-slots; and the row of depressible keys located over said bar and having the rolls adapted to engage said cam-slots, substantially as set forth.

2. The combination with the curved oscillatory type-bar, having the series of type characters upon its peripheral face; and the row of keys adapted when any one thereof is depressed to shift said type-bar; of the longitudinally-movable bar located beneath said keys and having the inclined cam-slots adapted to be engaged by said keys; and a variously-stepped stop adapted to be shifted into proper relation with said type-bar when any one of said keys is depressed, substantially as set forth.

3. The combination with the curved oscillatory type-bar having the type upon its periphery and the impact-lug; and the row of keys adapted when depressed singly to shift said type-bar; of the pivoted stop having the graded impact-notches and the teeth; the lever having the rack-arm meshing with said teeth, and means whereby the depression of any one of said keys is adapted to move said lever and present the proper notch to the impact of said impact-lug, substantially as set forth.

4. The combination with the curved oscillatory type-bar having the type upon its periphery, and the impact-lug; of the row of keys adapted when depressed singly to shift said type-bar; of the pivoted stop having the graded impact-notches and the teeth; the lever having the rack-arm meshing with said teeth; the longitudinally-movable bar located beneath said row of keys and having the inclined cam-slots adapted to be engaged by said keys, and intermediate connections between said bar and lever for enabling the reciprocation of said bar to actuate said lever, substantially as set forth.

5. The combination with the curved oscillatory type-bar having the type upon its periphery and normally presenting its median point to the printing device; of the row of keys adapted when depressed singly to shift said type-bar to one side or the other of said median point; the longitudinally-movable bar located beneath said keys and having the inclined cam-slots adapted to be engaged by said keys; the lever having the two rack-arms; intermediate connections between said lever and bar and enabling the reciprocation of the latter to operate said lever; and the two pivoted stops having the graded impact-notches and the teeth, substantially as set forth.

6. In a type-writing machine, the pivoted hammer having the flat surface centrally located with respect to the pivotal point; the spring pressing upon said surface; and means for raising and releasing said hammer, substantially as set forth.

7. In a type-writing machine, the combination of the pivoted hammer; the spring controlling the same; the longitudinally-reciprocative detent having the inclined shoulder, and the detent-shoulder engaging the tail rigidly projecting from said hammer; and the post; whereby the movement of said detent first acts to raise the hammer, and then the engagement of said inclined shoulder with said post serves to release said hammer from the detent, substantially as set forth.

8. In a type-writing machine, the combination of the row of depressible keys; the bar located beneath the same and adapted to be depressed when any one of said keys is moved; the bell-crank lever connected with said bar; the slotted plate pivotally supporting said lever; the pivoted arm; the rod joined to said lever and arm; the detent carried by said rod; and the hammer adapted to be actuated by said detent, substantially as set forth.

9. In a type-writing machine, the combination of the row of depressible keys; the bar located beneath the same and adapted to be depressed when any one of said keys is moved; the pivoted bell-crank levers supporting said bar upon their substantially horizontal arms; the slender rod pivoted to the upright arms of said levers, and elastic means for keeping said bar in a normally elevated position, substantially as set forth.

10. In a type-writing machine, the combination with the apertured case, of the key having the stem; the spiral spring surrounding said stem and supporting the key; and the sleeve inclosing said spring and movable in said aperture, substantially as set forth.

11. In a type-writing machine, the combination of the keys having the stem and the slotted shoulder; the antifriction devices in said slot; the two bars located side by side with their upper edges in said slot and having the inclined cam-slots entered by said antifriction devices; and the depressible bar engaged by said shoulder, substantially as set forth.

12. In a type-writing machine, the combination of the curved oscillatory type-bar having the type upon its periphery and the V-notches opposite thereto; the row of depressible keys; the bar adapted to be depressed by the movement of any one of said keys; the lock fitted to said notches in said type-bar; and means whereby the depression of said bar acts to throw said lock into engagement with one of said notches, substantially as set forth.

13. In a type-writing machine, the combination with the printing devices, of the reel for winding the paper tape; the drum connected with said reel; the tensioned cord wound on said drum; the drag-roll; the pressure-roll; and means for permitting the intermittent movement of said drag-roll, substantially as set forth.

14. In a type-writing machine, the combination with the type-bar and the row of keys controlling the same, of the depressible bar actuated by any one of said keys; the post depending from said bar; the rod in line with said post, and means for elastically raising it; the pawl pivoted to the lower end of said rod; the face-plate having the pins engaged by said pawl; the worm turning with said face-plate; the worm-gear meshing with said worm; the roll turning with said gear; and the pressure-roll elastically pressed against said roll, substantially as set forth.

15. In a type-writing machine, a case formed in two separable sections, the upper or cover portion of which is provided with keys upon its exterior reaching through to its interior; type-writing devices secured within said cover portion and adapted to be actuated by said keys; and paper-feeding devices located in the lower section of said case, the type-writing devices being constructed to receive the paper when the said sections are folded together or closed, and to release the paper when opened, substantially as set forth.

In testimony that I claim the foregoing invention I have hereunto set my hand this 2d day of July, 1900.

GEORGE H. WILLIAMS.

Witnesses:
GEO. A. MYERS,
A. B. UPHAM.